(12) United States Patent
Barngrover

(10) Patent No.: US 9,803,749 B2
(45) Date of Patent: Oct. 31, 2017

(54) HYDRAULICALLY COUPLED MULTI-VARIATOR ACTUATOR

(71) Applicant: Caterpillar Inc., Peoria, IL (US)

(72) Inventor: Michael Barngrover, Brimfield, IL (US)

(73) Assignee: Caterpillar Inc., Peoria, IL (US)

(*) Notice: Subject to any disclaimer, the term of this patent is extended or adjusted under 35 U.S.C. 154(b) by 87 days.

(21) Appl. No.: 14/818,403

(22) Filed: Aug. 5, 2015

(65) Prior Publication Data

US 2017/0037964 A1    Feb. 9, 2017

(51) Int. Cl.
*F16H 61/433*    (2010.01)
*F16H 37/08*    (2006.01)
*F16H 47/04*    (2006.01)

(52) U.S. Cl.
CPC ....... *F16H 61/433* (2013.01); *F16H 37/0833* (2013.01); *F16H 47/04* (2013.01); *F16H 2037/088* (2013.01); *F16H 2047/045* (2013.01)

(58) Field of Classification Search
CPC ..................................................... F16H 61/433
See application file for complete search history.

(56) References Cited

U.S. PATENT DOCUMENTS

| | | | | |
|---|---|---|---|---|
| 3,917,014 A | * | 11/1975 | Ward | B62D 11/183 180/6.48 |
| 4,047,467 A | * | 9/1977 | Lundin | B60K 17/10 180/6.48 |
| 4,461,148 A | | 7/1984 | Krusche | |
| 4,561,250 A | | 12/1985 | Aoyagi et al. | |
| 8,024,925 B2 | | 9/2011 | Cronin | |
| 8,500,587 B2 | | 8/2013 | Du et al. | |
| 2012/0297758 A1 | | 11/2012 | Nelson et al. | |

FOREIGN PATENT DOCUMENTS

JP    2002211873 A    7/2002

* cited by examiner

*Primary Examiner* — F. Daniel Lopez
(74) *Attorney, Agent, or Firm* — Jeffrey A. Greene

(57) ABSTRACT

A system for hydraulically coupled multi-variator actuation is disclosed. One system includes: a first hydraulic variator comprising: a first hydraulic pump; and a first hydraulic motor linked to the first hydraulic pump. The system may further include a second hydraulic variator comprising: a second hydraulic pump; and a second hydraulic motor linked to the second hydraulic pump. The system may further include a first actuator linked to the first hydraulic pump and configured to control a displacement of the first hydraulic pump; a second actuator linked to the second hydraulic pump and configured to control a displacement of the second hydraulic pump; a hydraulic link connecting the first actuator and the second actuator, the hydraulic link configured to facilitate a coordinated operation of the first actuator and the second actuator; a valve disposed in fluid communication with the hydraulic link connecting the first actuator and the second actuator; and a controller connected to the valve and configured to control an operation of the valve to regulate hydraulic flow in the hydraulic link.

14 Claims, 4 Drawing Sheets

HYDRAULICALLY COUPLED MULTI-VARIATOR ACTUATOR

TECHNICAL FIELD

This disclosure relates generally to hydrostatic transmissions and more particularly to hydraulically coupled multi-variator actuation in a hydrostatic transmission.

BACKGROUND

A hydrostatic transmission may be used in a heavy machine, such as a construction or agricultural machine, to deliver power from a power source, such as the engine, to the drivetrain of the heavy machine. The hydrostatic transmission may include one or more variators, each including a hydraulic motor paired with a hydraulic pump. The variators may be configured so as to provide continuously variable torque and speed to the drivetrain of the heavy machine, thus allowing the power source to operate at its ideal operating mode (e.g., an optimal range of revolutions per minute (RPM) or at an optimal fuel consumption rate) according to present power requirements.

One potential drawback of hydrostatic transmissions is that it has proven difficult to scale up the system, particularly with regard to the size of the hydraulic pumps and motors, to account for larger machine sizes. For example, larger displacement hydraulic pumps and motors inherently possess much more limited operating speed capabilities than smaller pumps and motors. In addition, large-sized piston hydraulic displacement pumps or motors tend to be less efficient than their smaller-sized counterparts. Further, larger-sized actuators will be required for controlling larger pumps and motors, thus requiring larger control valves to handle the higher control flow requirements and complicating the system design.

One method of addressing the aforementioned drawbacks relating to scaling difficulties is to include two or more variators operating in parallel. In such hydrostatic transmissions, however, the two variators must perform the same function (i.e., produce identical power flows) or else suffer inefficiencies caused by a mismatch in function.

U.S. Pat. No. 8,500,587 to Du et al. (the '587 patent) provides one solution that allegedly addresses the problem of matching the functions of the two parallel variators. The '587 patent discloses a hydrostatic transmission containing two variators, each comprising a hydraulic motor and hydraulic pump in a respective hydraulic circuit. To match the functions of the two variators, the two variators are connected by two bridging hydraulic links. The first bridging hydraulic link connects a first side of the hydraulic circuit of the first variator to a respective first side of the hydraulic circuit of the second variator. Similarly, the second bridging hydraulic link connects a second side of the hydraulic circuit of the first variator to a respective second side of the hydraulic circuit of the second variator. The two bridging hydraulic links may compensate for any flow difference between the hydraulic circuits of the two variators. Although the '587 patent discloses one technique for matching the functions of parallel variators, other systems and methods may be implemented to facilitate matching the functions of parallel variators.

SUMMARY

This disclosure relates to hydraulically coupled multi-variator actuation. One example system includes: a first hydraulic variator comprising: a first hydraulic pump; and a first hydraulic motor linked to the first hydraulic pump. The system may further include a second hydraulic variator comprising: a second hydraulic pump; and a second hydraulic motor linked to the second hydraulic pump. The system may further include a first actuator linked to the first hydraulic pump and configured to control a displacement of the first hydraulic pump; a second actuator linked to the second hydraulic pump and configured to control a displacement of the second hydraulic pump; a hydraulic link connecting the first actuator and the second actuator, the hydraulic link configured to facilitate a coordinated operation of the first actuator and the second actuator; a valve disposed in fluid communication with the hydraulic link connecting the first actuator and the second actuator; and a controller connected to the valve and configured to control an operation of the valve to regulate hydraulic flow in the hydraulic link.

A system configured to control a multi-variator system having a first and second variator, each one of the first and second variators having a hydraulic pump and a hydraulic motor, the system may include: a first actuator linked to the hydraulic pump of the first variator and configured to control a displacement of the hydraulic pump of the first variator; a second actuator linked to the hydraulic pump of the second variator and configured to control a displacement of the hydraulic pump of the second variator; a hydraulic link connecting the first actuator and the second actuator and configured to facilitate a coordinated operation of the first actuator and the second actuator; a valve disposed in fluid communication with the hydraulic link connecting the first actuator and the second actuator; and a controller connected to the valve and configured to control an operation of the valve to regulate hydraulic flow in the hydraulic link.

A method of controlling a multi-variator system, the method may include the steps of: hydraulically connecting, via a hydraulic link, a first actuator configured to control a hydraulic pump of a first variator and a second actuator configured to control a hydraulic pump of a second variator, wherein the hydraulically connecting step facilitates a coordinated operation of the first actuator and the second actuator; and regulating, by a valve disposed in fluid communication with the hydraulic link, a hydraulic flow in the hydraulic link to further facilitate the coordinated operation of the first actuator and the second actuator.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

This disclosure provides a system incorporating hydraulically coupled multi-variator actuation in a hydrostatic transmission. As an example, a hydrostatic transmission disposed on a machine may include a pair of variators, each comprising a variable displacement hydraulic pump and a fixed hydraulic motor. The power output from a power source, such as the engine of the machine, may be split, such as via a gear set, to provide an input to the hydraulic pump of each variator. The output from the hydraulic motor of each variator may be combined, such as via a second gear set, into a common output. The common output may be used to power various operations of the machine, such as the operation of the machine drivetrain. The displacement of the hydraulic pumps may be continuously varied to adjust the speed and/or torque of the common output.

The displacement of the hydraulic pump of each variator may be varied by operation of an actuator, such as a double-acting hydraulic piston actuator, linked to each hydraulic pump. To facilitate the coordinated operation of each of the variators, and thus maintain the efficiency of the hydrostatic transmission, the actuators controlling each of the hydraulic pumps of each variator may be hydraulically linked. By virtue of the hydraulic pressure transferred via the hydraulic link, the actuators, and thus the hydraulic pumps, may operate synchronously. Further, a controller may monitor the state of the hydrostatic transmission, such as for a difference in pump loop pressures of the two variators, and a hydraulic link valve disposed in the hydraulic link may be operated to correct the difference in pump loop pressures.

Figure 1:
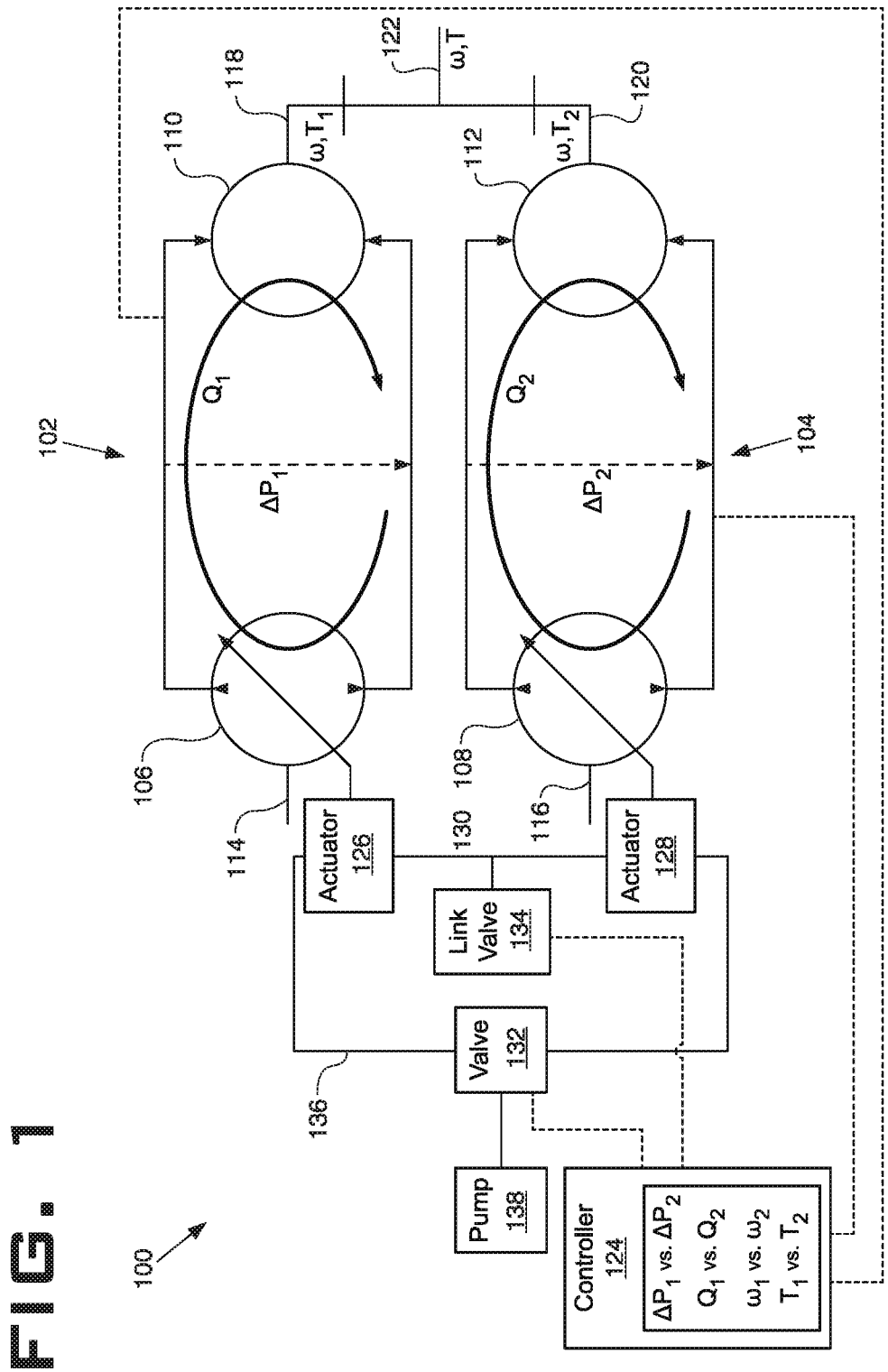
FIG. 1 illustrates a schematic diagram of an exemplary hydrostatic transmission in accordance with aspects of the disclosure.

FIG. 1 illustrates a schematic diagram of a hydrostatic transmission 100 using hydraulically coupled multi-variator actuation. The hydrostatic transmission 100 may include a first variator 102 and a second variator 104. The first variator 102, second variator 104, and associated components, as described herein, may also be incorporated in systems or contexts other than that of a hydrostatic transmission. Although the example hydrostatic transmission 100 provided in FIG. 1 is shown with two variators, the hydrostatic transmission 100 may include more than two variators.

The first variator 102 may include a first hydraulic pump 106. The first hydraulic pump 106 may be a variable displacement hydraulic pump and may have a swash plate. As an example, the first hydraulic pump 106 may be or comprise an axial piston pump and may have a swash plate. As such, the angle of the swash plate of the first hydraulic pump 106 may be adjusted to change the displacement of the first hydraulic pump 106. The first variator 102 may also include a first hydraulic motor 110, which may be hydraulically connected to the first hydraulic pump 106. As an example, the first hydraulic motor 110 may be a fixed displacement hydraulic motor.

The second variator 104 may include a second hydraulic pump 108. The second hydraulic pump 108 may be a variable displacement hydraulic pump and may have a swash plate. As an example, the second hydraulic pump 108 may be or comprise an axial piston pump and may have a swash plate. As such, the angle of the swash plate of the second hydraulic pump 108 may be adjusted to change the displacement of the second hydraulic pump 108. The second variator 104 may also include a second hydraulic motor 112, which may be hydraulically connected to the second hydraulic pump 108. As an example, the second hydraulic motor 112 may be a fixed displacement hydraulic motor.

The first hydraulic pump 106 and the second hydraulic pump 108 may each receive a power input via a first input shaft 114 and a second input shaft 116, respectively. A power source, such as an internal combustion engine of the machine, may provide a single common input. The common input may be split, by a gear set for example, into two or more inputs. For example, the gear set may split the power of the common input equally between the two or more inputs. The two or more inputs split from the common power input may drive the first input shaft 114 and the second input shaft 116, respectively. The first input shaft 114 and the second input shaft 116 may power the first hydraulic pump 106 and the second hydraulic pump 108, respectively, of the first variator 102 and the second variator 104, respectively, to each produce an output via a first output shaft 118 and a second output shaft 120, respectively. The first output shaft 118 and the second output shaft 120 may be mechanically tied via a gear set to produce the common output 122. The common output 122 may be used to power a drivetrain, or other application, of the machine upon which the hydrostatic transmission 100 is disposed. The drivetrain may be mechanically linked to a propulsive means of the vehicle, such as wheels or tracks. The common output 122 may additionally or alternatively be used to power an implement disposed on the vehicle to perform a task, such as a bucket, a lifting device, a boom, auger, or the like.

Figure 4:
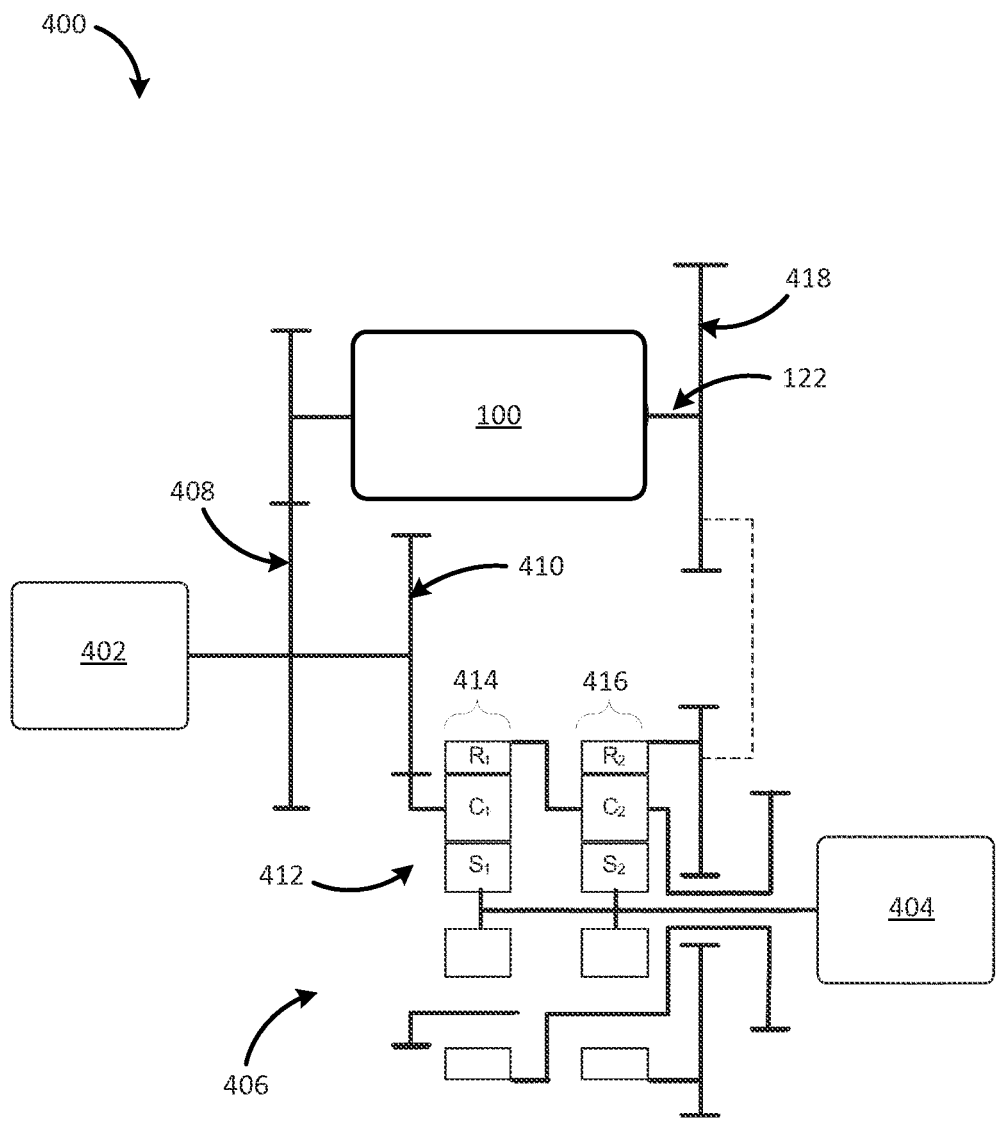
FIG. 4 illustrates a schematic diagram of an exemplary split power continuously variable transmission in accordance with aspects of the disclosure.

The hydrostatic transmission 100 may operate as a component of a larger transmission system. For example, the hydrostatic transmission 100 may be included in a split power continuously variable transmission (CVT). Referring to FIG. 4, in a split power CVT 400, there may be two parallel paths of power transmission from an input 402 to an output 404: one involving a hydrostatic transmission, such as the hydrostatic transmission 100, and another involving a mechanical transmission 406. The split power CVT 400 may have the input 402 mechanically linked to an engine and the output 404 mechanically linked to a downstream gear train. The input 402 may be connected to an input gear set 408 that may power the hydrostatic transmission 100. The input 402 may also be connected to a mechanical transmission input gear 410 that may power the mechanical transmission 406. The mechanical transmission 406 may include a planetary gear arrangement 412 with a first planetary gear set 414 and a second planetary gear set 416. The first planetary gear set 414 of the planetary arrangement 412 may be connected to and receive power input from the mechanical transmission input gear 410. The second planetary gear set 416 of the planetary arrangement 412 may be connected to the common output 122, via a common output gear 418, of the hydrostatic transmission 100.

In operation, the planetary gear arrangement 412 may combine the hydrostatic output power from the hydrostatic transmission 100 with the split input mechanical power to provide hydro-mechanical output power for application to a load, such as the propulsive means of the vehicle or an implement disposed thereon. As such, the speed and torque in each of the power ranges initially set by gear ratios of the planetary gear arrangement 412 can be continuously varied by varying the displacements of the first hydraulic pump 106 and/or the second hydraulic pump 108 of the hydrostatic transmission 100.

As used throughout this disclosure, the term "linked" shall mean a connection between two or more elements wherein an aspect or operation of one element affects an aspect or operation of another element. The term shall not be construed to require a direct connection, but may also include an indirect connection, such as a connection including one or more intermediary elements.

Returning again to FIG. 1, as the displacement of each of the first hydraulic pump 106 and the second hydraulic pump 108 is varied according to the manipulation of the swash plate of each of the first hydraulic pump 106 and the second hydraulic pump 108, the speed and/or torque of the respective first hydraulic motor 110 and the second hydraulic motor 112 may be controlled. In this manner, the common output 122 speed and/or torque may be regulated to accommodate various operating parameters while still maintaining a relatively constant engine speed.

Since the first variator 102 and the second variator 104 are tied together via the gear set connecting the first input shaft 114 and the second input shaft 116 and the gear set connecting the first output shaft 118 and the second output shaft 120, any mismatch in the characteristics of the first variator 102 and the second variator 104, including those of the first hydraulic pump 106 and the second hydraulic pump 108 and the first hydraulic motor 110 and the second hydraulic motor 112, of the first variator 102 and the second variator 104, may result in the first variator 102 and the second variator 104 working against each other and thus negatively impact the efficiency of the hydrostatic transmission 100.

Figure 2:
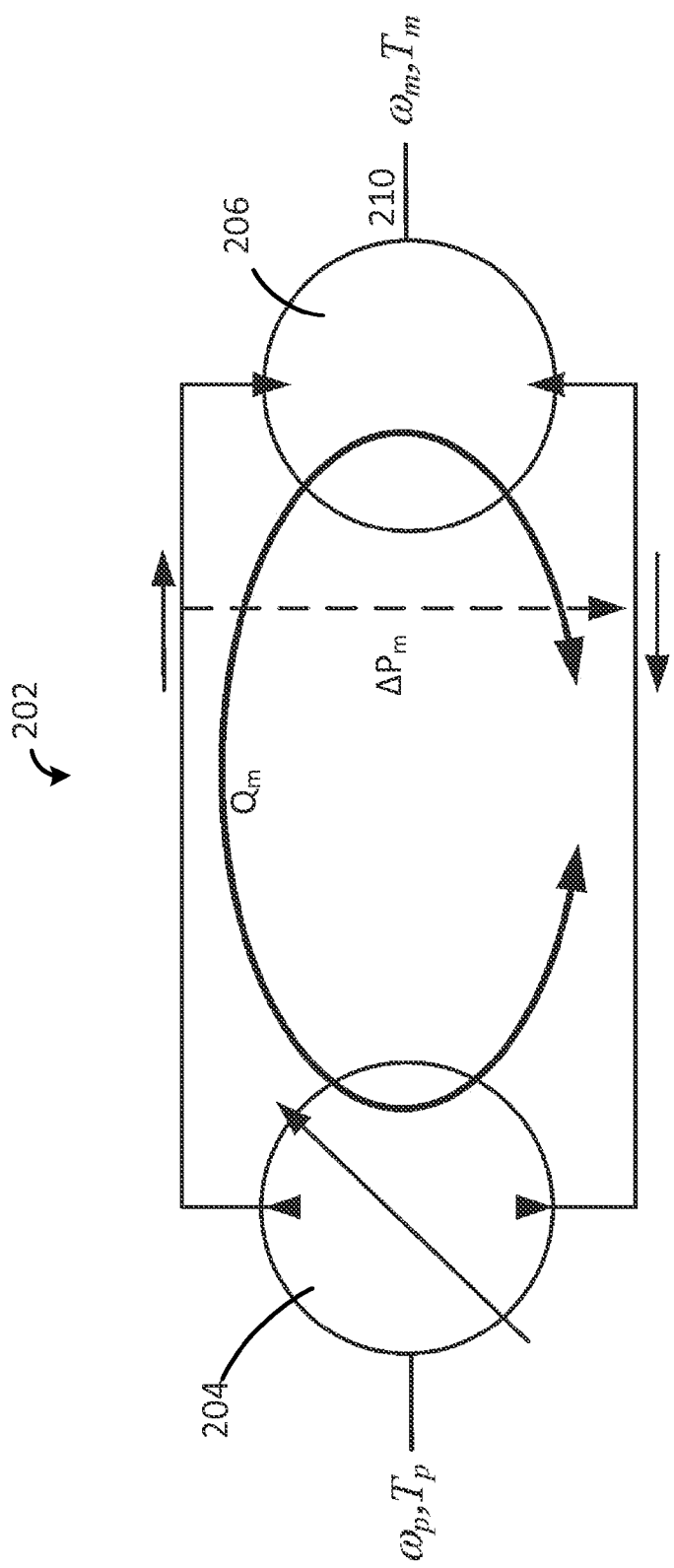
FIG. 2 illustrates a schematic diagram of an exemplary variator in accordance with aspects of the disclosure.

The fundamental requirement to avoid conflict and loss of efficiency when using multiple variators in parallel is that at the steady state, all the variators should perform the same function, or work in the same mode, i.e., applying torque or receiving torque. FIG. 2 illustrates a schematic drawing of a variator 202, such as the first variator 102 or the second variator 104, which may similarly include a hydraulic pump 204 and a hydraulically connected hydraulic motor 206. The working mode is defined by power flow, which can be determined by the sign of the product of the hydraulic motor 206 output torque $T_m$ and hydraulic motor 206 output speed $\omega_m$, $sgn(T_m\omega_m)$, as indicated by the following equations:

$$sgn(T_m\omega_m) \geq 0 \quad (1)$$

and $$sgn(T_m\omega_m) < 0 \quad (2)$$

If Eq. (1) is satisfied, then the power flow is positive, and the variator 202 working mode is that the hydraulic pump 204 works as a pump and the hydraulic motor 206 works as a motor. If Eq. (2) is satisfied, then the power flow is negative and the variator 202 working mode is that the hydraulic pump 204 works as a motor and the hydraulic motor 206 works as a pump. Since $$sgn(T_m\omega_m) = sgn(\Delta P_m D_m Q_m) \quad (3)$$

where $D_m$ is the displacement of the hydraulic motor 206, the variator 202 working mode can also be determined by the sign of the product of pump loop pressure $\Delta P_m$ and the pump loop flow $Q_m$ as expressed by $$sgn(\Delta P_m D_m Q_m) \geq 0 \quad (4)$$

and $$sgn(\Delta P_m D_m Q_m) < 0 \quad (5)$$

If Eq. (4) is satisfied, the power flow is positive and the variator 202 working mode is that the hydraulic pump 204 works as a pump and the hydraulic motor 206 works as a motor. If Eq. (5) is satisfied, the power flow is negative and the variator 202 working mode is that the hydraulic pump 204 works as a motor and the hydraulic motor 206 works as a pump.

For a fixed displacement hydraulic motor, Eqs. (4) and (5) become $$sgn(\Delta P_m Q_m) \geq 0 \quad (6)$$

and $$sgn(\Delta P_m Q_m) < 0 \quad (7)$$

If the direction of pump loop flow $Q_m$ is constrained by its output 210, the power flow will only be determined by the sign of the pump loop pressure $\Delta P_m$. Therefore, controlling the pump loop pressure $\Delta P_m$ will control the variator 202 power flow and thus controls the variator 202 working mode.

As such, it would be beneficial in multiple variator applications to force all variators to work in the same mode when they are integrated together at their output to power the related system. In particular, it would be beneficial for the pump loop pressure $\Delta P_m$ in all variators to be equal. This is more important at low pump loop pressure for steady state pressure control accuracy since small changes can result in a mode reversal at low pressures. In addition, during the system transients it is important to maintain accuracy since variators fighting each other at this time could result in system instability, e.g., oscillations.

Referring again to FIG. 1, the swash plate of the first hydraulic pump 106 may be mechanically linked to a first actuator 126 to effectuate adjustment of the respective swash plate. Although the linking of the first actuator 126 is described relative to the first hydraulic pump 106, it is understood that the first actuator 126 may be linked to other components such as a variable motor (e.g., of a variator) and the like. As an example, the first actuator 126 may be or comprise a hydraulic actuator. The hydraulic actuator may include a cylinder and a movable piston within the cylinder. The hydraulic actuator may be double-acting, such that hydraulic pressure may be applied to either side of the piston within the cylinder and the difference in pressure between the two sides may effectuate movement of the piston within the cylinder.

The swash plate of the second hydraulic pump 108 may be mechanically linked to a second actuator 128 to effectuate adjustment of the respective swash plate. Although the linking of the second actuator 128 is described relative to the second hydraulic pump 108, it is understood that the second actuator 128 may be linked to other components such as a variable motor (e.g., of a variator) and the like. As an example, the second actuator 126 may be or comprise a hydraulic actuator. The hydraulic actuator may include a cylinder and a movable piston within the cylinder. The hydraulic actuator may be double-acting, such that hydraulic pressure may be applied to either side of the piston within the cylinder and the difference in pressure between the two sides may effectuate movement of the piston within the cylinder. As will be described in further detail, a piston on the first actuator 126 may be mechanically linked to a piston of the second actuator 128 to facilitate synchronous operation. In certain embodiments, a single actuator may be configured to control a position of the swash plates of each of the hydraulic pumps 106, 108.

The operation and control of the first actuator 126 and the second actuator 128 may be accomplished with a valve 132 disposed along a hydraulic channel 136 between a hydraulic pump 138 and one or more of the first actuator 126 and the second actuator 128. The valve 132 may include a single four-way valve or two three-way valves. The valve 132 may be communicatively connected to a controller 124, which controls the operation of the valve 132. The controller 124 may control the operation of the first actuator 126 and/or the second actuator 128 and/or other aspects of the hydrostatic transmission 100 according to an input from a machine operator. The controller 124 may be communicatively connected to a level, pedal, or other input means that may be manipulated by the machine operator to effectuate the operation of the machine.

The ends of each of the first actuator 126 and second actuator 128 that are not connected to the valve 132 may be connected by a hydraulic link 130. A hydraulic link valve 134 may be disposed in fluid communication with the hydraulic link 130 and may regulate the flow of hydraulic fluid within the hydraulic link 130. The hydraulic link valve 134 may include a balancing valve. The operation of the hydraulic link valve 134 may be controlled by the controller 124. The hydraulic link 130 and the hydraulic link valve 134 may operate to coordinate the operation of the first actuator 126 and the second actuator 128 so that the swash plate of the first hydraulic pump 106 and the swash plate of the second hydraulic pump 108 may cause the first hydraulic pump 106 and the second hydraulic pump 108 to each operate at equal displacements, and thus maintain a balance of the pump loop pressure $\Delta P_1$ and the pump loop pressure $\Delta P_2$ so that the pump loop pressure $\Delta P_1$ equals the pump loop pressure $\Delta P_2$.

As used throughout the disclosure, the term "coordinated operation" may refer to an operation of two more elements in a manner that furthers a common objective. For example, the first actuator 126 and the second actuator 128 may be coordinately operated so that the pump loop pressure $\Delta P_1$ equals the pump loop pressure $\Delta P_2$. In some instances, "coordinated operation" may refer to an operation of two or more elements in which an operation of one element substantially matches an operation of a second element. For example, the coordinated operation of the first actuator 126 and the second actuator 128 may include the first actuator 126 and the second actuator 128 operating at substantially matched displacements.

The controller 124 may monitor one or more operational aspects of the hydrostatic transmission 100, such as the pump loop pressure $\Delta P_1$, $\Delta P_2$, pump loop flow $Q_1$, $Q_2$, output torque $T_1$, $T_2$, and output speed $\omega_1$, $\omega_2$ of the first variator 102 and the second variator 104. The one or more operational aspects may be monitored via one or more sensors included in the controller 124 or otherwise disposed in the hydrostatic transmission 100. The controller 124 may alter the operation of the hydraulic link valve 134 according to the one or more operational aspects of the hydrostatic transmission 100. For example, if the controller 124 determines that the pump loop pressure $\Delta P_1$ of the first variator 102 is higher than the pump loop pressure $\Delta P_2$ of the second variator 104, the controller 124 may operate the hydraulic link valve 134 so that the second actuator 128 positions the swash plate of the second hydraulic pump 108 to increase the displacement of the second hydraulic pump 108 and, thus, increase the pump loop pressure $\Delta P_2$ of the second variator 104 to match that of the first variator 102.

Figure 3:
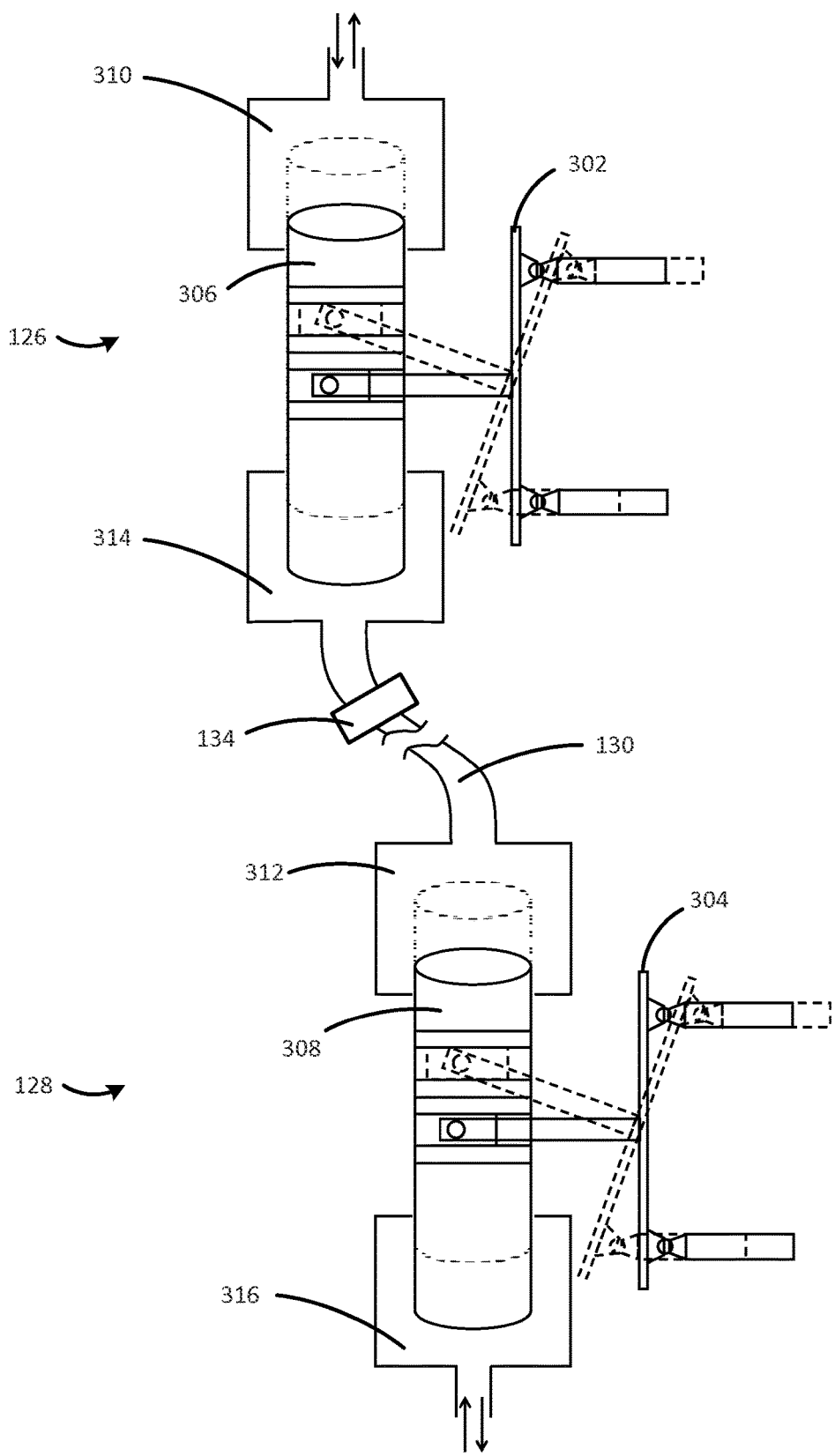
FIG. 3 illustrates a schematic diagram of an exemplary detailed portion of a hydrostatic transmission in accordance with aspects of the disclosure.

FIG. 3 provides a schematic diagram illustrating a detailed example of the hydraulically coupled actuation in the hydrostatic transmission 100. FIG. 3 depicts the first actuator 126 for the first variator 102, which may include a movable first piston 306 disposed between a first volume 310 and a second volume 314. As an example, the first piston 306 may be disposed within a cylinder barrel, within which the first piston 306 may reciprocate. The first volume 310 may be defined by an area enclosed by one end of the first piston 306 and corresponding portion of the cylinder barrel. The second volume 314 may be defined by an area enclosed by an opposite end of the first piston 306 and corresponding portion of the cylinder barrel. The first volume 310 and/or the second volume 314 may be additionally defined by a chamber in fluid communication with the cylinder barrel. The first piston 306 may be mechanically linked to and operate a first swash plate 302 of the first hydraulic pump 106 of the first variator 102. The first volume 310 and the second volume 314 may each be filled with hydraulic fluid. The flow and pressure of the hydraulic fluid within the first volume 310 may be provided by the hydraulic pump 138, with which the first volume 310 may be fluidly connected, and regulated by the valve 132. Hydraulic pressure may be imparted upon the first piston 306 by the flow of the hydraulic fluid within the first volume 310 or the second volume 314, thus causing movement of the first piston 306. The movement of the first piston 306, in turn, may cause the operation of the first swash plate 302 and, therefore, may vary the displacement of the first hydraulic pump 106. Exemplary movements of the first piston 306 and the first swash plate 302 are represented in FIG. 3 as dashed lines.

Also depicted in FIG. 3 is the second actuator 128 for the second variator 104. Similar to the first actuator 126, the second actuator 128 may include a movable second piston 308 disposed between a first volume 312 and a second volume 316. As an example, the second piston 308 may be disposed within a cylinder barrel, within which the second piston 308 may reciprocate. The first volume 312 may be defined by an area enclosed by one end of the second piston 308 and corresponding portion of the cylinder barrel. The second volume 316 may be defined by an area enclosed by an opposite end of the second piston 308 and corresponding portion of the cylinder barrel. The first volume 312 and/or the second volume 316 may be additionally be defined by a chamber in fluid communication with the cylinder barrel. The second piston 308 may be mechanically linked to and operate a second swash plate 304 of the second hydraulic pump 108 of the second variator 104. The first volume 312 and the second volume 316 may each be filled with hydraulic fluid. The flow and pressure of the hydraulic fluid in the second volume 316 may be provided by the hydraulic pump 138, with which the first volume 312 may be fluidly connected, and regulated by the valve 132. Hydraulic pressure may be imparted upon the second piston 308 by the flow of the hydraulic fluid within the first volume 312 or the second volume 316. The hydraulic pressure within the first volume 312 or the second volume 316 may cause movement of the second piston 308 and, thus, via the mechanical linkage, movement of the second swash plate 304 of the second hydraulic pump 108. The operation of the second swash plate 304 may vary the displacement of the second hydraulic pump 108. Exemplary movements of the second piston 308 and the second swash plate 304 are represented in FIG. 3 as dashed lines.

The first actuator 126 for the first hydraulic pump 106 of the first variator 102 and the second actuator 128 for the second hydraulic pump 108 of the second variator 104 may be connected via the hydraulic link 130. In particular, the second volume 314 of the first actuator 126 of the first variator 102 and the first volume 312 of the second actuator 128 of the second variator 104 may be connected via the hydraulic link 130. For example, the hydraulic link 130 may include a tube, pipe, hose, or the like. The hydraulic link 130 may be metal, rubber, or other suitable material. The hydraulic link 130 may be filled with hydraulic fluid, through which hydraulic pressure may be transmitted.

Due to the hydraulic linkage between the second volume 314 and the first volume 312, the operation of the first actuator 126 and the second actuator 128, and thus the respective first swash plate 302 and second swash plate 304, may be coordinated. For example, if hydraulic pressure is exerted in the second volume 316 of the second actuator 128, the second piston 308 may move as a result of that hydraulic pressure and contract the volume of the first volume 312 of the second actuator 128. The movement of the second piston 308 may accordingly cause an operation of the second swash plate 304. Since the first volume 312 of the second actuator 128 is hydraulically linked, via the hydraulic link 130, to the second volume 314 of the first actuator 126, the contraction of the first volume 312 of the second actuator 128 may cause hydraulic pressure within the second volume 314 of the first actuator 126. The hydraulic pressure within the second volume 314 of the first actuator 126 may thus cause a movement of the first piston 306 of the first actuator 126. The movement of the first piston 306 may cause an operation of the first swash plate 302. As will be appreciated, this transfer of hydraulic pressure from one actuator to another, and vice versa, via the hydraulic link 130 may serve to cause synchronized movement of the first actuator 126 and the second actuator 128 and the first swash plate 302 and the second swash plate 304, and, therefore, the equal displacements of the first hydraulic pump 106 and the second hydraulic pump 108 and the equal pump loop pressures $\Delta P_1$, $\Delta P_2$.

The flow of hydraulic fluid within the hydraulic link 130, and thus the hydraulic pressure within the second volume 314 of the first actuator 126 and the first volume 312 of the second actuator 128, may be regulated by an operation of the hydraulic link valve 134. This may be necessary, for example, due to leakage within the hydrostatic transmission 100, including the hydraulic link 130. The regulation of the flow of the hydraulic fluid between the second volume 314 and the first volume 312 may be based on a determination, such as by the controller 124, of a difference in the pump loop pressures $\Delta P_1$, $\Delta P_2$ of the first variator 102 and the second variator 104, respectively. The operation of the hydraulic link valve 134 may be performed according to a determined operation that will equalize the pump loop pressures $\Delta P_1$, $\Delta P_2$ of the first variator 102 and the second variator 104. As an example, if it is determined that the pump loop pressure $\Delta P_1$ of the first variator 102 is lower than the pump loop pressure $\Delta P_2$ of the second variator 104, the hydraulic link valve 134 may be operated to increase the hydraulic pressure within the second volume 314 of the first actuator 126 for the first variator 102. The increased hydraulic pressure within the second volume 314 may cause a movement of the first piston 306 of the first actuator 126 and, thus, an operation of the first swash plate 302 of the first hydraulic pump 106 of the first variator 102. The operation of the first swash plate 302 may, in turn, cause the displacement of the first hydraulic pump 106 to increase and, therefore, the pump loop pressure $\Delta P_1$ to increase, such as to a pump loop pressure equal to the pump loop pressure $\Delta P_2$ of the second variator 104.

INDUSTRIAL APPLICABILITY

The industrial applicability of the system for hydraulically coupled multi-variator actuation in a hydrostatic transmission described herein will be readily appreciated from the foregoing discussion.

The disclosed system may be used in any application in which a transmission is used to link a power source to a work load, wherein, in particular, it may be desirable to continuously vary the speed and/or torque of the transmission output to the work load. For example, the disclosed system may be employed in a heavy machine used for mining, construction, farming, transportation, or any other industry known in the art. Examples of such a machine may include a wheel loader, excavator, dump truck, bulldozer, harvester, or the like. The disclosed system may be employed to power a work load, such as the drivetrain propelling the machine or an implement of the machine, such as a bucket, compactor, lifting device, auger, or the like.

The disclosed system for hydraulically coupled multi-variator actuation in a hydrostatic transmission may facilitate efficient operation of a multi-variator hydrostatic transmission, such as the hydrostatic transmission 100. In order for a multi-variator hydrostatic transmission to operate efficiently, each of the variators, such as the first variator 102 and the second variator 104, must operate in cooperation or else risk causing inefficiencies due to the variators operating against each other or "fighting" each other. In particular, the pump loop pressure of a first variator may be equalized to the pump loop pressure of a second variator to ensure that the first and second variators operate in sync and thus operate without loss of efficiency. This efficient operation may be accomplished by hydraulically linking, such as via the hydraulic link 130, the actuator controlling the swash plate of the hydraulic pump of the first variator to the actuator controlling the swash plate of the hydraulic pump of the second variator. The hydraulic linkage may facilitate the synchronous operation (including displacement) of each the hydraulic pumps of each variator, thus providing equal pump loop pressures in each of the variators. In addition, the hydraulic link may include a hydraulic link valve, such as the hydraulic link valve 134, that may be operated to adjust the operation of one or more of the actuators to compensate for a determined difference in the pump loop pressures of the variators.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely example in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

I claim:

1. A system comprising:
   a first hydraulic variator comprising:
      a first hydraulic pump; and
      a first hydraulic motor linked to the first hydraulic pump;
   a second hydraulic variator comprising:
      a second hydraulic pump; and
      a second hydraulic motor linked to the second hydraulic pump;
   a first actuator linked to the first hydraulic pump and configured to control a displacement of the first hydraulic pump;
   a second actuator linked to the second hydraulic pump and configured to control a displacement of the second hydraulic pump;
   a hydraulic link connecting the first actuator and the second actuator, the hydraulic link configured to facilitate a coordinated operation of the first actuator and the second actuator;
   a valve disposed in fluid communication with the hydraulic link connecting the first actuator and the second actuator; and
   a controller connected to the valve and configured to control an operation of the valve to regulate hydraulic flow in the hydraulic link based on a difference in a pump loop pressure of the first hydraulic variator and a pump loop pressure of the second hydraulic variator.

2. The system of claim 1, wherein the first actuator comprises a moveable first piston and the second actuator comprises a moveable second piston, and wherein a movement of one or more of the first piston and the second piston is effectuated by the hydraulic flow in the hydraulic link.

3. The system of claim 1, wherein:
   the first actuator is mechanically linked to a swash plate of the first hydraulic pump and the first actuator is configured to control a displacement of the first hydraulic pump via operation of the swash plate of the first hydraulic pump; and
   the second actuator is mechanically linked to a swash plate of the second hydraulic pump and the second actuator is configured to control a displacement of the second hydraulic pump via operation of the swash plate of the second hydraulic pump.

4. The system of claim 1, wherein one or more of the first actuator and the second actuator comprises a double-acting hydraulic actuator.

5. The system of claim 1, wherein one or more of the hydraulic pump of the first hydraulic variator and the hydraulic pump of the second hydraulic variator comprises a hydraulic axial piston pump.

6. The system of claim 1, wherein a hydraulic pressure in the hydraulic link imparted by operation of the first actuator causes an operation of the second actuator.

7. A continuously variable transmission comprising:
   a mechanical transmission having an input, the mechanical transmission having;
      a planetary gear arrangement;
   a hydrostatic transmission having an input and an output, the output of the hydrostatic transmission being connected to the planetary gear arrangement, the hydrostatic transmission having;
      a first variator having a hydraulic pump and a hydraulic motor;
      a second variator having a hydraulic pump and a hydraulic motor;
      a first actuator linked to the hydraulic pump of the first variator and configured to control a displacement of the hydraulic pump of the first variator;
      a second actuator linked to the hydraulic pump of the second variator and configured to control a displacement of the hydraulic pump of the second variator;
      a hydraulic link connecting the first actuator and the second actuator and configured to facilitate a coordinated operation of the first actuator and the second actuator;
      a valve disposed in fluid communication with the hydraulic link connecting the first actuator and the second actuator; and
      a controller connected to the valve and configured to control an operation of the valve to regulate hydraulic flow in the hydraulic link based on a difference in a pump loop pressure of the first hydraulic variator and a pump loop pressure of the second hydraulic variator.

8. The continuously variable transmission of claim 7, wherein the first actuator comprises a moveable first piston and the second actuator comprises a moveable second piston, and wherein a movement of one or more of the first piston and the second piston is effectuated by the hydraulic flow in the hydraulic link.

9. The continuously variable transmission of claim 7, wherein:
   the first actuator is mechanically linked to a swash plate of the hydraulic pump of the first variator and the first actuator is configured to control the displacement of the hydraulic pump of the first variator via operation of the swash plate of the hydraulic pump of the first variator; and
   the second actuator is mechanically linked to a swash plate of the hydraulic pump of the second variator and the second actuator is configured to control the displacement of the hydraulic pump of the second variator via operation of the swash plate of the hydraulic pump of the second variator.

10. The continuously variable transmission of claim 7, wherein one or more of the first actuator and the second actuator comprises a double-acting hydraulic actuator.

11. The continuously variable transmission of claim 7, wherein one or more of the hydraulic pump of the first variator and the hydraulic pump of the second variator comprises a hydraulic axial piston pump.

12. A method of operating a multi-variator system, the method comprising:
hydraulically connecting, via a hydraulic link, a first actuator configured to control a first hydraulic pump of a first variator and a second actuator configured to control a second hydraulic pump of a second variator, wherein the hydraulically connecting facilitates a coordinated operation of the first actuator and the second actuator;
determining a difference in a pump loop pressure of the first variator and a pump loop pressure of the second variator; and
regulating, by a valve disposed in fluid communication with the hydraulic link, a hydraulic flow in the hydraulic link to further facilitate the coordinated operation of the first actuator and the second actuator to equalize the pump loop pressure of the first variator and the pump loop pressure of the second variator.

13. The method of claim 12, wherein the first actuator comprises a moveable first piston and the second actuator comprises a moveable second piston, and wherein a movement of one or more of the first piston and the second piston is effectuated by the hydraulic flow in the hydraulic link.

14. The method of claim 12, further comprising:
mechanically linking the first actuator to a swash plate of the hydraulic pump of the first variator, wherein the first actuator is configured to control the displacement of the hydraulic pump of the first variator via operation of the swash plate of the hydraulic pump of the first variator; and
mechanically linking the second actuator to a swash plate of the hydraulic pump of the second variator, wherein the second actuator is configured to control the displacement of the hydraulic pump of the second variator via operation of the swash plate of the hydraulic pump of the second variator.

* * * * *